United States Patent
Peterson et al.

(10) Patent No.: US 12,076,913 B2
(45) Date of Patent: Sep. 3, 2024

(54) FEED MATERIAL FOR THREE-DIMENSIONAL PRINTING CONTAINING A POLYOXYMETHYLENE POLYMER

(71) Applicant: Ticona LLC, Florence, KY (US)

(72) Inventors: Craig Peterson, Hebron, KY (US); Kirsten Markgraf, Weinheim (DE); Xiaowei Zhang, Union, KY (US)

(73) Assignee: TICONA LLC, Florence, KY (US)

( * ) Notice: Subject to any disclaimer, the term of this patent is extended or adjusted under 35 U.S.C. 154(b) by 140 days.

(21) Appl. No.: 17/125,160

(22) Filed: Dec. 17, 2020

(65) Prior Publication Data

US 2021/0206051 A1 Jul. 8, 2021

Related U.S. Application Data

(60) Provisional application No. 62/949,036, filed on Dec. 17, 2019.

(51) Int. Cl.
| | | |
|---|---|---|
| B29C 64/118 | (2017.01) | |
| B29C 64/255 | (2017.01) | |
| B29K 71/00 | (2006.01) | |
| B29K 75/00 | (2006.01) | |
| B33Y 10/00 | (2015.01) | |
| B33Y 30/00 | (2015.01) | |
| B33Y 70/00 | (2020.01) | |
| C08L 59/04 | (2006.01) | |
| C09D 7/65 | (2018.01) | |
| C09D 159/02 | (2006.01) | |

(52) U.S. Cl.
CPC .......... *B29C 64/118* (2017.08); *B29C 64/255* (2017.08); *B33Y 10/00* (2014.12); *B33Y 30/00* (2014.12); *B33Y 70/00* (2014.12); *C08L 59/04* (2013.01); *C09D 7/65* (2018.01); *C09D 159/02* (2013.01); *B29K 2023/06* (2013.01); *B29K 2071/02* (2013.01); *B29K 2075/00* (2013.01); *C08L 2205/14* (2013.01)

(58) Field of Classification Search
None
See application file for complete search history.

(56) References Cited

U.S. PATENT DOCUMENTS

| | | | | |
|---|---|---|---|---|
| 5,318,813 A * | 6/1994 | Flexman, Jr. | ............ | C08L 59/02 525/154 |
| 5,889,102 A * | 3/1999 | Haack | ........ | C08L 59/00 524/496 |
| 7,569,273 B2 | 8/2009 | Bredt et al. | | |
| 2006/0235119 A1* | 10/2006 | Schmalz | ............ | C08G 18/4825 524/196 |
| 2013/0136881 A1* | 5/2013 | Fan | .......... | C08L 59/02 525/154 |
| 2013/0331488 A1* | 12/2013 | Markgraf | ........... | C08G 18/7671 525/472 |
| 2015/0184110 A1* | 7/2015 | Hwang | .................. | C08L 59/02 508/269 |
| 2015/0367605 A1* | 12/2015 | Morikawa | .............. | B05D 3/007 427/388.1 |
| 2016/0024293 A1 | 1/2016 | Nestle et al. | | |
| 2017/0157845 A1* | 6/2017 | Bihari | .................. | B29C 64/393 |
| 2018/0087189 A1 | 3/2018 | Wetzel et al. | | |
| 2018/0202076 A1 | 7/2018 | Van Der Schaaf et al. | | |
| 2018/0361657 A1 | 12/2018 | Powale et al. | | |
| 2018/0361658 A1 | 12/2018 | Gaggar et al. | | |
| 2019/0030790 A1* | 1/2019 | Fujita | .................... | B29C 64/118 |
| 2019/0352804 A1 | 11/2019 | Kopping et al. | | |
| 2021/0060851 A1 | 3/2021 | Nakai et al. | | |

FOREIGN PATENT DOCUMENTS

| | | | | |
|---|---|---|---|---|
| CN | 103881289 A | 6/2014 | | |
| CN | 103980445 A | 8/2014 | | |
| CN | 104163634 A | 11/2014 | | |
| CN | 104177551 A | 12/2014 | | |
| CN | 105504662 A | 4/2016 | | |
| CN | 106832838 A | 6/2017 | | |
| CN | 107674282 A | 2/2018 | | |
| CN | 109093109 A | 12/2018 | | |
| CN | 110117402 A | 8/2019 | | |
| GB | 2566934 A | 4/2019 | | |
| WO | WO 2016/080573 A1 | 5/2016 | | |
| WO | WO 2017/100447 A1 | 6/2017 | | |
| WO | WO-2017130469 A1 * | 8/2017 | ............ | B29B 15/08 |
| WO | WO 2018/129525 A1 | 7/2018 | | |
| WO | WO 2018/146281 A1 | 8/2018 | | |

(Continued)

OTHER PUBLICATIONS

Celcon M25-04 data sheet, downloaded Jan. 13, 2023. (Year: 2023).*
"Polyisobutylene" (Polymer Science learning Center) Feb. 19, 2021 (Feb. 19, 2021) [Retrieved on Feb. 18, 2021] Retrieved from the Internet <URL:https://pslc.ws/macrog/pib.htm>.
International Search Report and The Written Opinion of the International Searching Authority, or the Declaration PCT/US20/65491 on Mar. 12, 2021.
European Search Report Corresponding to Application No. 20903411.5 on Nov. 16, 2024.

*Primary Examiner* — Christopher M Rodd
(74) *Attorney, Agent, or Firm* — DORITY & MANNING, P.A.

(57) ABSTRACT

A polymer composition containing a polyoxymethylene polymer having low shrinkage characteristics and/or an expanded processing window is disclosed. The polymer composition is particularly well suited for use in three-dimensional printing systems, such as printers that use filament fusion technology. The polymer composition, for instance, can be a feed material in the form of a filament or polymeric pellets. The feed material can be placed in a printer cartridge for insertion into a three-dimensional printing system. In accordance with the present disclosure, a polyoxymethylene polymer is combined with one or more dimensional stabilizing agents for dramatically improving the processing characteristics of the polymer.

16 Claims, 2 Drawing Sheets

(56) References Cited

FOREIGN PATENT DOCUMENTS

| WO | WO 2019/025472 A1 | 2/2019 |
| WO | WO 2019/053237 A1 | 3/2019 |
| WO | WO 2019/132402 A1 | 7/2019 |
| WO | WO 2019/164966 A1 | 8/2019 |

* cited by examiner

FEED MATERIAL FOR THREE-DIMENSIONAL PRINTING CONTAINING A POLYOXYMETHYLENE POLYMER

RELATED APPLICATIONS

The present application is based upon and claims priority to U.S. Provisional Patent Application Ser. No. 62/949,036, having a filing date of Dec. 17, 2019, which is incorporated herein by reference.

BACKGROUND

Additive manufacturing technologies or three-dimensional printing involve various different techniques and methods to produce three-dimensional articles. Additive manufacturing technologies, for instance, includes binder jetting, directed energy deposition, material extrusion, material jetting, powder bed fusion, and the like. One of the most widely used methods of additive manufacturing is material extrusion.

During material extrusion, a heated nozzle ejects a molten thermoplastic material onto a deposition surface. The thermoplastic material is deposited in thin layers, one on top of another, onto a print bed eventually forming a three-dimensional printed article. In order to produce a three-dimensional article in a particular pattern, the nozzle, the deposition surface, or both are moved while the thermoplastic is being extruded through the nozzle. The nozzle, for instance, can be placed in communication with a computer for producing a computer-aided design ("CAD"). Each layer of the thermoplastic material generally attaches to each adjacent layer through thermal bonding.

Material extrusion is one of the more popular additive manufacturing techniques. For instance, material extrusion is relatively inexpensive in comparison to many other methods and is scalable. The only constraint in size of the finished three-dimensional article, for instance, is the build area and the movement of each device. The system also makes it relatively easy to switch from one thermoplastic polymer to another. In addition, different thermoplastic polymers can be used to produce a single article.

Thermoplastic polymers that have been used in the past in material extrusion include polyethylene, polyethylene terephthalate, polystyrene, and polyphenylsulfone. The process requires that the thermoplastic polymer be capable of thermally bonding together with a relatively large operating window to allow for the deposition of each layer.

Polyacetal polymers, which are commonly referred to as polyoxymethylene polymers, have been used sparingly in material extrusion. Although the polymers have excellent mechanical properties, fatigue resistance, abrasion resistance, and chemical resistance, polyoxymethylene polymers can have relatively short operating windows and have high stiffness and shrinkage, which can result in cracking.

In view of the above, a need exists for a polymer composition containing a polyoxymethylene polymer that can be used in material extrusion technologies.

SUMMARY

In general, the present disclosure is directed to a polymer composition containing a polyoxymethylene polymer that is well suited for use in a material extrusion process for producing three-dimensional articles. The present disclosure is also directed to a feed material for a three-dimensional extrusion printing system. In accordance with the present disclosure, the polymer composition containing the polyoxymethylene polymer is formulated to display low shrinkage characteristics. In addition, the polymer composition can be formulated to have a wide operating window so that different operating temperatures can be used during the material extrusion method in addition to allowing for extended periods of time for the different layers to thermally bond together during the process of building the product.

In one embodiment, for instance, the present disclosure is directed to a feed material for a three-dimensional extrusion printing system. The feed material may comprise a continuous filament or a polymeric pellet. When in the form of a filament, the filament can have a filament diameter of from about 0.5 mm to about 5 mm, such as from about 1.5 mm to about 3.5 mm. When in the form of a polymeric pellet, on the other hand, the polymeric pellet can have a diameter of from about 0.5 mm to about 2 mm and can have a length of from about 1 mm to about 20 mm. In accordance with the present disclosure, the continuous filament or polymeric pellet is comprised of a polymer composition containing a polyoxymethylene polymer in an amount greater than about 30% by weight. For instance, the polymer composition can contain the polyoxymethylene polymer in an amount greater than about 50% by weight, such as in an amount greater than about 60% by weight, such as in an amount greater than about 70% by weight.

In one aspect, the polyoxymethylene polymer can be a polyoxymethylene copolymer. For example, the polyoxymethylene polymer can be made with a comonomer comprising a cyclic ether, such as dioxolane. In one embodiment, the polyoxymethylene copolymer can have relatively low amounts of comonomer which has been found to dramatically improve the operating window of the polymer. For instance, the polyoxymethylene copolymer may contain the comonomer in an amount less than about 2% by weight, such as in an amount less than about 1.5% by weight, such as in an amount less than about 1.25% by weight, such as in an amount less than about 1% by weight, such as in an amount less than about 0.75% by weight, such as in an amount less than about 0.7% by weight. The comonomer content is generally greater than about 0.1% by weight, such as greater than about 0.3% by weight. The polyoxymethylene polymer is blended with at least one dimensional stabilizing agent. The resulting blend displays a shrinkage of 1.5% or less, such as 1.3% or less, such as 1.2% or less, such as 1.1% or less, when tested according to ISO Test 294-4, 2577.

In one embodiment, the dimensional stabilizing agent may comprise an amorphous polymer. The dimensional stabilizing agent can be an elastomeric polymer. Particular dimensional stabilizing agents that may be used include a methacrylate butadiene styrene, a styrene acrylonitrile, a polycarbonate, a polyphenylene oxide, an acrylonitrile butadiene styrene, a methyl methacrylate, a polylactic acid, a copolyester elastomer, a styrene-ethylene-butylene-styrene block copolymer, a thermoplastic vulcanizate, an ethylene copolymer or terpolymer, an ethylene-propylene copolymer or terpolymer, a polyalkylene glycol, a silicone elastomer, an ethylene acrylate, high density polyethylene, a sulfonamide, or mixtures thereof.

In one embodiment, the dimensional stabilizing agent comprises a thermoplastic elastomer, such as a thermoplastic polyurethane elastomer. The thermoplastic polyurethane elastomer can be present in the polymer composition in an amount from about 4% to about 40% by weight. The polymer composition can also contain a coupling agent that couples the polyoxymethylene polymer to the dimensional stabilizing agent. The coupling agent, for instance, can be a polyisocyanate. In one embodiment, the coupling agent may couple to terminal hydroxyl groups on the polyoxymethylene polymer and in turn couple to other end groups or functional groups on the dimensional stabilizing agent. The polyoxymethylene polymer, for instance, can be manufactured to have a relatively high content of terminal hydroxyl groups. The terminal hydroxyl groups can be present on the polyoxymethylene polymer in an amount greater than 15 mmol/kg, such as greater than about 20 mmol/kg, such as greater than about 25 mmol/kg, such as greater than about 30 mmol/kg, and generally in an amount less than about 300 mmol/kg, such as less than about 100 mmol/kg.

In an alternative embodiment, the dimensional stabilizing agent may comprise a filler, such as filler particles or fibers. The filler may comprise a metallic powder, metallic fibers, glass fibers, mineral fibers, mineral particles, glass beads, hollow glass beads, glass flakes, polytetrafluoroethylene particles, graphite, boron nitride, or mixtures thereof. The filler can generally be present in the polymer composition in an amount from about 5% to about 60% by weight. In one aspect, a filler, such as glass fibers, can be present with a polymer additive, such as a high density polyethylene.

Through the use of one or more dimensional stabilizing agents and by selecting a polyoxymethylene polymer with particular characteristics, the polymer composition can have a crystallinity temperature and a melting temperature wherein the difference between the melting temperature and the crystallinity temperature is at least 10° C., such as at least 12° C., such as at least 14° C., such as at least 16° C., such as at least 18° C., such as at least 20° C. For instance, the melting temperature can generally be less than about 180° C. while the crystallinity temperature can generally be greater than about 130° C.

The present disclosure is also directed to a printer cartridge for three-dimensional extrusion printing. The printer cartridge contains a feed material as described above. When in the form of a filament, for instance, the feed material can be contained in the printer cartridge wound around a spool. When in the form of polymeric pellets, on the other hand, the polymeric pellets can be contained in a dispensing container within the printer cartridge.

The present disclosure is also directed to a three-dimensional printing system comprising a three-dimensional printing device and a printer cartridge as described above. The present disclosure is also directed to a three-dimensional article formed layer by layer in a material extrusion process. The present disclosure is also directed to a material extrusion method comprising selectively forming a three-dimensional structure from the feed material as described above.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
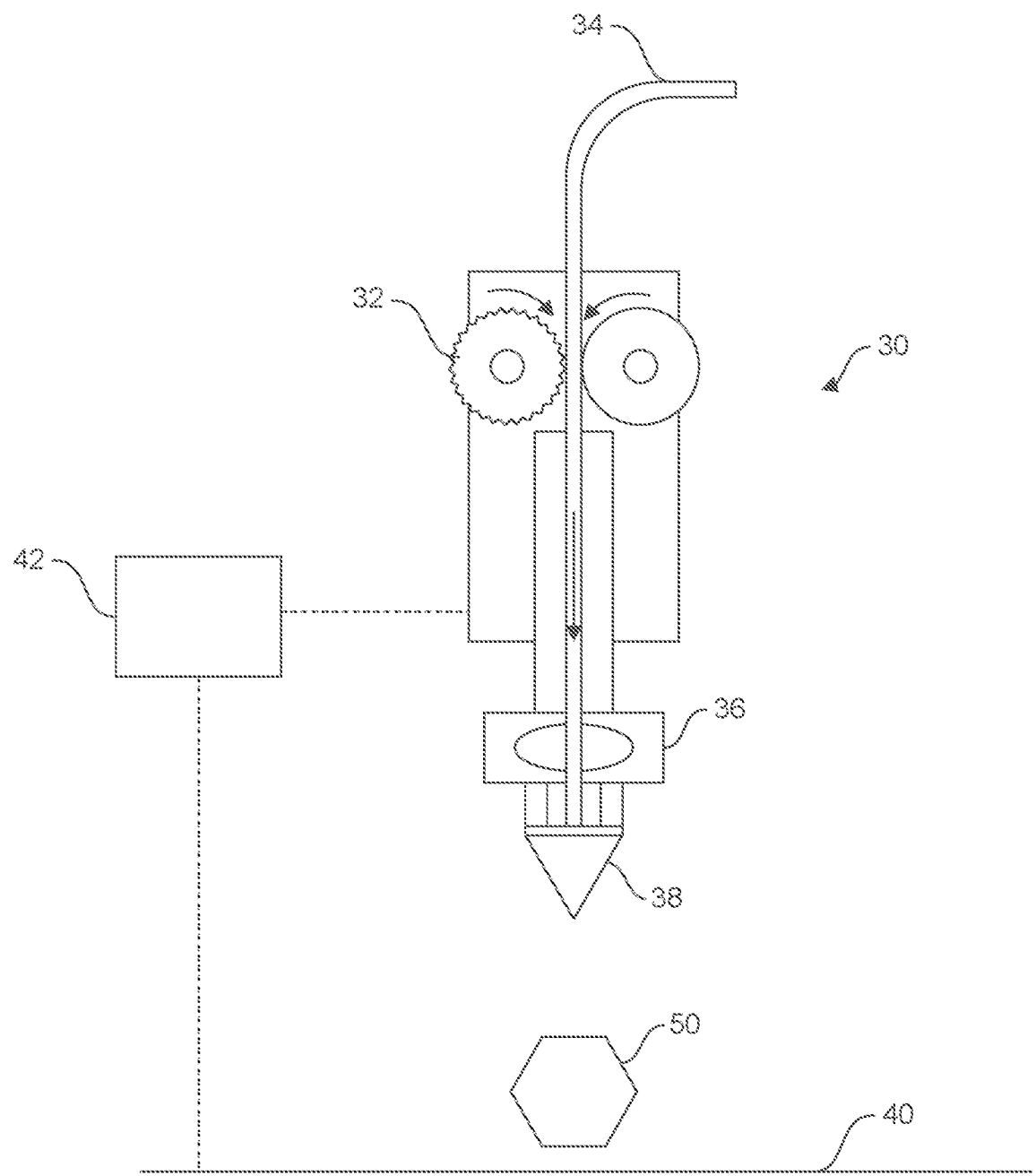
FIG. 1 is a plan view of one embodiment of a material extrusion system that may be used in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composition or feed material for additive manufacturing, particularly for use in a three-dimensional extrusion printing system. The present disclosure is also directed to a printing cartridge, a three-dimensional printing system, and a method for forming three-dimensional articles from the feed material. In general, the feed material or polymer composition contains a polyoxymethylene polymer. The polyoxymethylene polymer is combined with one or more dimensional stabilizing agents that significantly and dramatically improve the ability to process the polymer composition in three-dimensional printing systems.

The polymer composition of the present disclosure is capable of being employed as the feed material in a three-dimensional printer system, particularly a printer system that uses material extrusion. The polymer composition is flexible, yet also capable of retaining its shape, which allows the material to be more readily printed into complex shapes. This unique combination of dimensional stability and shape retention properties are achieved through selective control over the way the polymer composition is formulated. The polymer composition is formed from a polyoxymethylene polymer that forms a continuous phase or, in other words, serves as the matrix polymer. The polyoxymethylene polymer is then combined with one or more dimensional stabilizing agents that dramatically improve the shrinkage properties of the polyoxymethylene polymer thus making the polymer dimensionally stable for use in three-dimensional printing operations. The one or more dimensional stabilizing agents, for instance, can be incorporated into the polyoxymethylene polymer for reducing shear regions and/or stress intense regions during formation of a three-dimensional article. By reducing shear and stress within the polymer as the polymer is melted and solidifies, debonding between the different layers is minimized while also preventing the formation of cracks or other surface imperfections. Ultimately, the polymer composition containing the polyoxymethylene polymer can be used to form precise three-dimensional articles with high tolerances.

The polyoxymethylene polymer incorporated into the polymer composition can comprise a polyoxymethylene homopolymer or a polyoxymethylene copolymer.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. According to one embodiment, the polyoxymethylene is a homo- or copolymer which comprises at least 50 mol. %, such as at least 75 mol. %, such as at least 90 mol. % and such as even at least 97 mol. % of —$CH_2O$-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

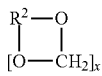

in which x is 0 or 1 and $R^2$ is a $C_2$-$C_4$-alkylene group which, if appropriate, has one or more substituents which are $C_1$-$C_4$-akyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.5 to 5 mol. %, such as from 0.5 to 4 mol. %, of one of the above-mentioned comonomers.

In one particular aspect of the present disclosure, the polyoxymethylene copolymer incorporated into the powder composition contains a relatively low amount of comonomer. For example, the polyoxymethylene copolymer can contain a comonomer, such as dioxolane, in an amount less than about 2% by weight, such as in an amount less than about 1.5% by weight, such as in an amount less than about 1.25% by weight, such as in an amount less than about 1% by weight, such as in an amount less than about 0.75% by weight, such as in an amount less than about 0.7% by weight. The comonomer content is generally greater than about 0.3% by weight, such as greater than about 0.5% by weight. It was unexpectedly discovered that maintaining low comonomer content in the polyoxymethylene polymer can dramatically increase the operating window of the polymer composition.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

Although any suitable polyoxymethylene polymer may be used, in one embodiment, the polyoxymethylene polymer used in the polymer composition may contain a relatively high amount of reactive groups or functional groups in the terminal position. The reactive groups or functional groups, for instance, can help compatibilize the polyoxymethylene polymer with the one or more dimensional stabilizing agents and/or with one or more other components that may be contained in the polymer composition. The reactive groups, for instance, may comprise —OH or —$NH_2$ groups.

In one embodiment, the polyoxymethylene polymer can have terminal hydroxyl groups, for example hydroxyethylene groups and/or hydroxyl side groups, on at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 15 mmol/kg, such as at least 18 mmol/kg, such as at least 20 mmol/kg, such as greater than about 25 mmol/kg, such as greater than about 30 mmol/kg, such as greater than about 40 mmol/kg, such as greater than about 50 mmol/kg. The terminal hydroxyl content is generally less than about 300 mmol/kg, such as less than about 200 mmol/kg, such as less than about 100 mmol/kg. In one embodiment, the terminal hydroxyl group content ranges from 18 to 50 mmol/kg. In an alternative embodiment, the polyoxymethylene polymer may contain terminal hydroxyl groups in an amount less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate. The quantification of the hydroxyl group content in the polyoxymethylene polymer may be conducted by the method described in JP-A-2001-11143.

In addition to the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —$CH_2O$-repeat units.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization can result in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2 wt. %.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally have a melt flow index (MFI) ranging from about 1 to about 200 g/10 min, as determined according to ISO 1133 at 190° C. and 2.16 kg, though polyoxymethylenes having a higher or lower melt flow index are also encompassed herein. For example, the polyoxymethylene polymer may have a melt flow index of greater than about 5 g/10 min, such as greater than about 10 g/10 min, such as greater than about 20 g/10 min, such as greater than about 30 g/10 min, such as greater than about 40 g/10 min, such as greater than about 50 g/10 min, such as greater than about 60 g/10 min, such as greater than about 70 g/10 min. The melt flow index of the polyoxymethylene polymer can be less than about 150 g/10 min, less than about 100 g/10 min, less than about 50 g/10 min, less than about 30 g/10 min, less than about 15 g/10 min, or less than about 12 g/10 min. In one embodiment, the polyoxymethylene polymer can have a melt flow index of greater than about 40 g/10 min, such as greater than about 45 g/10 min, such as greater than about 50 g/10 min, and generally less than about 80 g/10 min, such as less than about 70 g/10 min.

The polyoxymethylene polymer may be present in the polyoxymethylene polymer composition in an amount of at least 30 wt. %, such as at least 40 wt. %, such as at least 50 wt. %, such as at least 60 wt. %, such as at least 70 wt. %, such as at least 80 wt. %. In one embodiment, the polyoxymethylene polymer composition can contain almost exclusively the polyoxymethylene polymer. For example, the polyoxymethylene polymer can be present in an amount greater than about 90% by weight, such as in an amount greater than about 95% by weight, such as in an amount greater than about 96% by weight, such as in an amount greater than about 97% by weight, such as in an amount greater than about 98% by weight, such as in an amount greater than about 99% by weight.

In accordance with the present disclosure, the polyoxymethylene polymer is combined with one or more dimensional stabilizing agents. The dimensional stabilizing agent, for instance, may comprise a polymer component or a filler component. In one embodiment, the polymer composition can contain one or more polymer components and one or more filler components.

Polymers that can serve as the dimensional stabilizing agent include amorphous polymers or semi-crystalline polymers. Examples of dimensional stabilizing agents in polymer form include a methacrylate butadiene styrene, a styrene acrylonitrile, a polycarbonate, a polyphenylene oxide, an acrylonitrile butadiene styrene, a methyl methacrylate, a polylactic acid, a copolyester elastomer, a styrene ethylene butylene styrene block copolymer, a thermoplastic vulcanizate, an ethylene copolymer or terpolymer, an ethylene propylene copolymer or terpolymer, a polyalkylene glycol, a silicone elastomer, an ethylene acrylate, a high density polyethylene, a sulfonamide, or mixtures thereof.

In one embodiment, the dimensional stabilizing agent is a thermoplastic elastomer. Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with a coupling reagent and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one particular embodiment, a thermoplastic polyurethane elastomer is used as the dimensional stabilizing agent either alone or in combination with other dimensional stabilizing agents. The thermoplastic polyurethane elastomer, for instance, may have a soft segment of a long-chain dial and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as poly(butylene adipate)diol, polyethylene adipate)diol and poly(E-caprolactone) diol; and polyether diols such as poly(tetramethylene ether) glycol, poly(propylene oxide)glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic dials such as ethylene glycol, 1,4-butanediol, 1,6-hexanedial and neopentyl glycol. One example of a thermoplastic polyurethane is characterized as essentially poly(adipic acid-co-butylene glycol-co-diphenylmethane diisocyanate).

In general, the thermoplastic elastomer may be present in the composition in the amounts described above. In one embodiment, for instance, the thermoplastic elastomer may be present in the composition in an amount greater than about 10% by weight and in an amount less than about 60% by weight. For instance, the thermoplastic elastomer may be present in an amount from about 15% to about 25% by weight.

In an alternative embodiment, the dimensional stabilizing agent may comprise a non-aromatic polymer, which refers to a polymer that does not include any aromatic groups on the backbone of the polymer. Such polymers include acrylate polymers and/or graft copolymers containing an olefin. For instance, an olefin polymer can serve as a graft base and can be grafted to at least one vinyl polymer or one ether polymer. In still another embodiment, the graft copolymer can have an elastomeric core based on polydienes and a hard or soft graft envelope composed of a (meth)acrylate and/or a (meth) acrylonitrile.

Examples of dimensional stabilizing agents as described above include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, a dimensional stabilizing agent can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

The dimensional stabilizing agent may be a linear or branched, homopolymer or copolymer (e.g., random, graft, block, etc.) containing epoxy functionalization, e.g., terminal epoxy groups, skeletal oxirane units, and/or pendent epoxy groups. For instance, the dimensional stabilizing agent may be a copolymer including at least one monomer component that includes epoxy functionalization. The monomer units of the dimensional stabilizing agent may vary. For example, the dimensional stabilizing agent can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the dimensional stabilizing agent may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Examples of other monomers may include, for example, ester monomers, olefin monomers, amide monomers, etc. In one embodiment, the dimensional stabilizing agent can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

In one embodiment, the dimensional stabilizing agent can be a terpolymer that includes epoxy functionalization. For instance, the dimensional stabilizing agent can include a methacrylic component that includes epoxy functionalization, an α-olefin component, and a methacrylic component that does not include epoxy functionalization. For example, the dimensional stabilizing agent may be poly(ethylene-co-methylacrylate-co-glycidyl methacrylate), which has the following structure:

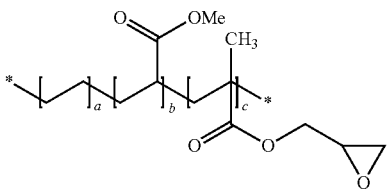

wherein, a, b, and c are 1 or greater.

In another embodiment the dimensional stabilizing agent can be a random copolymer of ethylene, ethyl acrylate and maleic anhydride having the following structure:

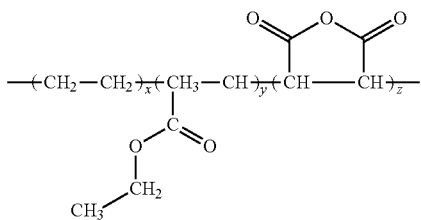

wherein x, y and z are 1 or greater.

The relative proportion of the various monomer components of a copolymeric dimensional stabilizing agent is not particularly limited. For instance, in one embodiment, the epoxy-functional methacrylic monomer components can form from about 1 wt. % to about 25 wt. %, or from about 2 wt. % to about 20 wt % of a copolymeric dimensional stabilizing agent. An α-olefin monomer can form from about 55 wt. % to about 95 wt. %, or from about 60 wt. % to about 90 wt. %, of a copolymeric dimensional stabilizing agent. When employed, other monomeric components (e.g., a non-epoxy functional methacrylic monomers) may constitute from about 5 wt. % to about 35 wt. %, or from about 8 wt. % to about 30 wt. %, of a copolymeric dimensional stabilizing agent.

The molecular weight of the above dimensional stabilizing agent can vary widely. For example, the dimensional stabilizing agent can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

The above dimensional stabilizing agent may be present in the composition in varying amounts depending on the application. For instance, the dimensional stabilizing agent can be present in an amount of 5% or greater of the thermoplastic composition, for instance from 15% to about 40% by weight, from about 18% to about 37% by weight, or from about 20% to about 35% by weight in some embodiments.

Other dimensional stabilizing agents that may be used in accordance with the present disclosure include polyepoxides, polyurethanes, polybutadiene, acrylonitrile-butadiene-styrene, polysiloxanes, polyamides, block copolymers (e.g., polyether-polyamide block copolymers), etc., as well as mixtures thereof.

In one particular embodiment, the dimensional stabilizing agent may include a polyepoxide that contains at least two oxirane rings per molecule. The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. The term "(meth)acrylic" includes acrylic and methacrylic monomers, as well as salts or esters thereof, such as acrylate and methacrylate monomers. Suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

In yet another embodiment, the dimensional stabilizing agent may include a block copolymer in which at least one phase is made of a material that is hard at room temperature but fluid upon heating and another phase is a softer material that is rubber-like at room temperature. For instance, the block copolymer may have an A-B or A-B-A block copolymer repeating structure, where A represents hard segments and B is a soft segment. Non-limiting examples of dimensional stabilizing agents having an A-B repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Triblock copolymers may likewise contain polystyrene as the hard segment and either polybutadiene, polyisoprene, or polyethylene-co-butylene as the soft segment. Similarly, styrene butadiene repeating co-polymers may be employed, as well as polystyrene/polyisoprene repeating polymers. In one particular embodiment, the block copolymer may have alternating blocks of polyamide and polyether. The polyamide blocks may be derived from a copolymer of a diacid component and a diamine component, or may be prepared by homopolymerization of a cyclic lactam. The polyether block may be derived from homo- or copolymers of cyclic ethers such as ethylene oxide, propylene oxide, and tetrahydrofuran.

In one embodiment, a triblock copolymer may be used as the dimensional stabilizing agent. For instance, the triblock copolymer may comprise a styrene ethylene butylene styrene (SEBS) block copolymer.

In still another embodiment, the dimensional stabilizing agent may comprise a silicone elastomer.

Illustrative silicone elastomers may comprise polydiorganosiloxanes such as polydimethylsiloxane. For example, a silicone elastomer can be a polydimethylsiloxane that can be terminated with, e.g., hydroxyl, or vinyl functionality. In one embodiment, the silicone elastomer can include at least 2 alkenyl groups having 2 to 20 carbon atoms. The alkenyl group can include, for example, vinyl, allyl, butenyl, pentenyl, hexenyl and decenyl. The position of the alkenyl functionality is not critical and it may be bonded at the molecular chain terminals, in non-terminal positions on the molecular chain, or at both positions. In general, the alkenyl functionality can be present at a level of 0.001 to 3 weight percent, preferably 0.01 to 1 weight percent, of the silicone elastomer. In one embodiment, the silicone elastomer dimensional stabilizing agent is a polydimethylsiloxane homopolymer that is terminated with a hydroxyl or a vinyl group at each end and optionally that also contains at least one vinyl group along its main chain.

Other organic groups of the silicone elastomer dimensional stabilizing agent can be independently selected from hydrocarbon or halogenated hydrocarbon groups that contain no aliphatic unsaturation. These can be exemplified by alkyl groups having 1 to 20 carbon atoms, such as methyl, ethyl, propyl, butyl, pentyl and hexyl; cycloalkyl groups, such as cyclohexyl and cycloheptyl; and halogenated alkyl groups having 1 to 20 carbon atoms, such as 3,3,3-trifluoropropyl and chloromethyl. It will be understood that these groups are selected such that the silicone elastomer has a glass transition temperature (or melt point) that is below room temperature and as such is therefore elastomeric.

The silicone elastomer dimensional stabilizing agent can be a homopolymer or a copolymer. The molecular structure is also not critical and is exemplified by straight-chain and partially branched straight-chains.

Specific illustrations of silicone elastomer non-aromatic dimensional stabilizing agents can include, without limitation, trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; dimethylvinylsiloxy-endblocked dimethylsiloxane-methylvinylsiloxane copolymers; and similar copolymers wherein at least one end group is dimethylhydroxysiloxy.

In one aspect, the dimensional stabilizing agent is a polyalkylene glycol. Polyalkylene glycols particularly well suited for use in the polymer composition include polyethylene glycols, polypropylene glycols, and mixtures thereof. For example, in one embodiment, the dimensional stabilizing agent incorporated into the polymer composition is a polyethylene glycol.

The molecular weight of the polyalkylene glycol can vary depending upon various factors including the characteristics of the polyoxymethylene polymer and the process conditions for producing shaped articles. In one aspect, the polyalkylene glycol, such as the polyethylene glycol, can have a relatively low molecular weight. For example, the molecular weight can be less than about 10,000 g/mol, such as less than about 8,000 g/mol, such as less than about 6,000 g/mol, such as less than about 4,000 g/mol, and generally greater than about 1000 g/mol, such as greater than about 2000 g/mol. In one embodiment, a polyethylene glycol plasticizer is incorporated into the polymer composition that has a molecular weight of from about 2000 g/mol to about 5000 g/mol.

In another aspect, a polyalkylene glycol, such as the polyethylene glycol, can be selected that has a higher molecular weight. For example, the molecular weight of the polyalkylene glycol can be about 10,000 g/mol or greater, such as greater than about 20,000 g/mol, such as greater than about 30,000 g/mol, such as greater than about 35,000 g/mol, and generally less than about 100,000 g/mol, such as less than about 50,000 g/mol, such as less than about 45,000 g/mol, such as less than about 40,000 g/mol.

In another aspect, the dimensional stabilizing agent are high density polyethylene particles, such as ultrahigh-molecular-weight polyethylene (UHMW-PE) particles. For example, from 0.1-50 wt. %, such as from 1-25 wt. %, such as from 2.5-20 wt. %, such as from 5 to 15 wt. %, of an ultrahigh-molecular-weight polyethylene (UHMW-PE) powder can be added to the polymer composition. UHMW-PE can be employed as a powder, in particular as a micropowder. The UHMW-PE generally has a mean particle diameter D50 (volume based and determined by light scattering) in the range of 1 to 5000 μm, preferably from 10 to 500 μm, and particularly preferably from 10 to 150 μm such as from 30 to 130 μm, such as from 80 to 150 μm, such as from 30 to 90 μm.

The UHMW-PE can have an average molecular weight of higher than about 300,000 g/mol, such as greater than about 500,000 g/mol, such as greater than about 1.0.106 g/mol, such as higher than 2.0.106 g/mol, such as higher than 4.0.106 g/mol, such as ranging from 1.0.106 g/mol to 15.0.106 g/mol, such as from 3.0.106 g/mol to 12.0.106 g/mol, determined by viscosimetry and the Margolies equation. The viscosity number of the UHMW-PE is higher than 1000 ml/g, such as higher than 1500 ml/g, such as ranging from 1800 ml/g to 5000 ml/g, such as ranging from 2000 ml/g to 4300 ml/g (determined according to ISO 1628, part 3; concentration in decahydronaphthalin: 0.0002 g/ml).

In another aspect, the dimensional stabilizing agent is a sulfonamide. In one aspect, the sulfonamide can be an ortho-para-toluene sulfonamide (35-45% ortho content). The toluene sulfonamide can have a relatively low melting point. For instance, the melting point of the sulfonamide can be less than about 120° C., such as less than about 115° C. The melting point is generally greater than about 50° C., such as greater than about 60° C., such as greater than about 75° C. The toluene sulfonamide can be in the form of a solid when combined with the other ingredients. In another aspect, the sulfonamide can be is an aromatic benzene sulfonamide represented by the general formula (I):

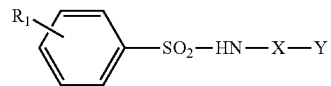

in which R1 represents a hydrogen atom, a C1-C4 alkyl group or a C1-C4 alkoxy group, X represents a linear or branched C2-C10 alkylene group, or an alkyl group, or a methylene group, or a cycloaliphatic group, or an aromatic group, and Y represents one of the groups H, OH or

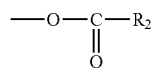

in which R2 represents a C1-C4 alkyl group or an aromatic group, these groups optionally themselves being substituted by an OH or C1-C4 alkyl group.

The preferred aromatic benzenesulphonamides of formula (I) are those in which: R1 represents a hydrogen atom or a methyl or methoxy group, X represents a linear or branched C2-C10 alkylene group or a phenyl group, Y represents an H, OH or —O—CO—R2 group, R2 representing a methyl or phenyl group, the latter being themselves optionally substituted by an OH or methyl group.

Mention may be made, among the aromatic sulphonamides of formula (I) which are liquid (L) or solid (S) at room temperature as specified below, of the following products, with the abbreviations which have been assigned to them:

N-(2-hydroxyethyl)benzenesulphonamide (L),
N-(3-hydroxypropyl)benzenesulphonamide (L),
N-(2-hydroxyethyl)-p-toluenesulphonamide (S),
N-(4-hydroxyphenyl)benzenesulphonamide (S),
N-[(2-hydroxy-1-hydroxymethyl-1-methyl)ethyl]benzenesulphonamide (L),
N-[5-hydroxy-1,5-dimethylhexyl]benzenesulphonamide (S),
N-(2-acetoxyethyl)benzenesulphonamide (S),
N-(5-hydroxypentyl)benzenesulphonamide (L),
N-[2-(4-hydroxybenzoyloxy)ethyl]benzene-sulphonamide (S),
N-[2-(4-methylbenzoyloxy)ethyl]benzenesulphonamide (S),
N-(2-hydroxyethyl)-p-methoxybenzenesulphonamide (S) and
N-(2-hydroxypropyl)benzenesulphonamide (L).

One particular sulfonamide, for example, is N-(n-butyl) benzene sulfonamide.

When the dimensional stabilizing agent comprises a polymer component, the dimensional stabilizing agent can be present in the polymer composition (in addition to amounts provided above) in an amount generally greater than about 3% by weight, such as in an amount greater than about 5% by weight, such as in an amount greater than about 8% by weight, such as in an amount greater than about 10% by weight, such as in an amount greater than about 12% by weight, such as in an amount greater than about 15% by weight, and generally less than about 60% by weight, such as less than about 40% by weight, such as less than about 30% by weight, such as less than about 25% by weight.

In addition to polymers, the dimensional stabilizing agent may also comprise a filler material. The filler material can be non-metallic or metallic. Examples of fillers that may serve as the dimensional stabilizing agent include a metallic powder, metallic fibers, glass fibers, mineral fibers, mineral particles, glass beads, hollow glass beads, glass flakes, polytetrafluoroethylene particles, graphite, boron nitride, or mixtures thereof.

Clay minerals may be particularly suitable for use as non-metallic fillers in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K, H_3O)(Al, Mg, Fe)_2 (Si,Al)_4O_{10}[(OH)_2, (H_2O)]$), montmorillonite ($Na, Ca)_{0.33}(Al, Mg)_2Si_4O_{10}(OH)_2 \cdot nH_2O$), vermiculite (($MgFe, Al)_3(Al, Si)_4O_{10}(OH)_2 \cdot 4H_2O$), palygorskite (($Mg, Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other particulate fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K, Na)(Al, Mg, Fe)_2(Si, Al)_4O_{10}(OH)_2$), etc., as well as combinations thereof.

Fibers may also be employed as a non-metallic filler to further improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 to about 10,000 MPa, and in some embodiments, from about 3,000 to about 6,000 MPa. Examples of such fibrous fillers may include those formed from glass, carbon, ceramics (e.g., alumina or silica), aramids (e.g., Kevlar® marketed by E.I. DuPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S2-glass, etc., as well as combinations thereof. Other configurations of glass fillers include beads, flakes, and microspheres.

The volume average length of the fibers may be from about 5 to about 400 micrometers, in some embodiments from about 8 to about 250 micrometers, in some embodiments from about 10 to about 200 micrometers, and in some embodiments, from about 12 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 5 to about 400 micrometers. The fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The dimensional stabilizing agent may also be made up of a polytetrafluoroethylene, such as polytetrafluroethylene particles. The polytetrafluoroethylene particles, for instance, can have an average particle size of less than about 15 microns, such as less than about 12 microns, such as less than about 10 microns, such as less than about 8 microns. The average particle size of the polytetrafluoroethylene particles is generally greater than about 0.5 microns, such as greater than about 1 micron, such as greater than about 2 microns, such as greater than about 3 microns, such as greater than about 4 microns, such as greater than about 5 microns. Average particle size can be measured according to ISO Test 13321.

In one embodiment, the polytetrafluoroethylene particles can have a relatively low molecular weight. The polytetrafluoroethylene polymer may have a density of from about 300 g/l to about 450 g/l, such as from about 325 g/l to about 375 g/l when tested according to ASTM Test D4895. The polytetrafluoroethylene particles can have a specific surface area of from about 5 $m^2/g$ to about 15 $m^2/g$, such as from about 8 $m^2/g$ to about 12 $m^2/g$ when tested according to Test DIN66132. The melt flow rate of the polytetrafluoroethylene polymer can be less than about 3 g/10 min, such as less than about 2 g/10 min when tested according to ISO Test 1133 when carried out at 372° C. with a load of 10 kg.

The polytetrafluoroethylene particles can be present in the polymer composition in an amount greater than about 0.5% by weight, such as in an amount greater than about 1% by weight, such as in an amount greater than about 5% by weight, such as in an amount greater than about 8% by weight. The polytetrafluoroethylene polymer is generally present in the polymer composition in an amount less than about 40% by weight, such as in an amount less than about 20% by weight, such as in an amount less than about 10% by weight, such as in an amount less than about 8% by weight.

The polymer composition may also contain at least one metallic filler. Examples of such metallic fillers may include stainless steel, ferrous materials such as black iron oxide ($Fe_3O_4$), magnetite, carbonyl iron, copper, aluminum, nickel, permalloy, etc., as well as mixtures thereof. Particularly suitable are stainless steel fibers or powders, which may have a ferromagnetic content of about 90 wt. % or more, in some embodiments about 95 wt. % or more, and in some embodiments, from about 98 wt. % to 100 wt. %. Suitable stainless steel fillers include those comprised of a grade 300-series austenitic or grade 400-series ferritic or martensitic stainless steels, or combinations thereof, as defined by the American Iron and Steel Institute (AISI). Suitable commercially available magnetic fillers include those such as POLYMAG from Eriez Magnetics; Beki-Shield BU08/5000 CR E, Beki-Shield BU08/12000 CR E, and/or BU11/7000 CR E P-BEKRT from Bekaert; PPO-1200-NiCuNi, PPO-1200-NiCu, and/or PPO-1200-Ni from Composite Material; G30-500 12K A203 MC from Toho Carbon Fiber; INCOFIBER® 12K20 and/or INCOFIBER® 12K50 from Inco Special Products; Novamet Stainless Steel Flakes from Novamet Specialty Products.

When the metallic filler is in the form of particles, the mean particle size may be from about 0.5 microns to about 100 microns, in some embodiments from about 0.7 microns to about 75 microns, and in some embodiments, from about 1 micron to about 50 microns. In addition, the particles may have a mean particle size such that at least about 90% of the particles pass through a 150 mesh (105 microns), in some embodiments at least about 95%, and in some embodiments, at least about 98%. Stainless steel particles may have a mean particle size such that at least about 90% of the particles pass through a 325 mesh (44 microns), in some embodiments at least about 95%, and in some embodiments, at least about 98%. Likewise, when metallic flakes are employed, the flakes may have a thickness of from about 0.4 to about 1.5 microns, in some embodiments from about 0.5 to about 1 micron, and in some embodiments, from about 0.6 to 0.9 microns. In addition, the flakes may have a size such that at least about 85% of the particles pass through a 325 mesh (44 microns), in some embodiments at least about 90%, and in some embodiments, at least about 95%. Further, metallic fibers may also have a diameter of from about 1 micron to about microns, in some embodiments from about 2 to about 15 microns, and in some embodiments, from about 3 to about 10 microns. The fibers may also have an initial length of from about 2 to about 30 mm, in some embodiments from about 3 to about 25 mm, and in some embodiments from about 4 to about 20 mm.

When the dimensional stabilizing agent is one or more fillers, the one or more fillers can be present in the polymer composition in an amount greater than about 3% by weight, such as in an amount greater than about 5% by weight, such as in an amount greater than about 8% by weight, such as in an amount greater than about 10% by weight, such as in an amount greater than about 12% by weight, such as in an amount greater than about 15% by weight, and generally in an amount less than about 60% by weight, such as in an amount less than about 50% by weight, such as in an amount less than about 40% by weight, such as in an amount less than about 30% by weight, such as in an amount less than about 25% by weight, such as in an amount less than about 20% by weight.

In one embodiment, in addition to one or more dimensional stabilizing agents, the polymer composition can contain a coupling agent. The coupling agent can be used to compatibilize the different components. For instance, the coupling agent can couple to the polyoxymethylene polymer and to the one or more dimensional stabilizing agents, even if the stabilizing agent is a polymer or filler. For example, in one embodiment, the filler can be coated with a sizing agent that can couple to the coupling agent.

In one embodiment, the coupling agent comprises a polyisocyanate, such as a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODD; toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5- trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

When present, the coupling agent can be present in the composition in an amount generally from about 0.1% to about 5% by weight. In one embodiment, for instance, the coupling agent can be present in an amount from about 0.1% to about 2% by weight, such as from about 0.2% to about 1% by weight. In an alternative embodiment, the coupling agent can be added to the polymer composition in molar excess amounts when comparing the reactive groups on the coupling agent with the amount of functional groups on the polyoxymethylene polymer.

The polymer composition of the present disclosure can also optionally contain a stabilizer and/or various other additives. Such additives can include, for example, antioxidants, acid scavengers, UV stabilizers or heat stabilizers. In addition, the polymer composition may contain processing auxiliaries, for example adhesion promoters, lubricants, or antistatic agents.

For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g., 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyoxanilide and 2-ethoxy-4'-dodecyloxanilide; cyanoacrylates, e.g., ethyl-.alpha.-cyano-.beta., .beta.-diphenylacrylate and methyl-2-cyano-3-methyl-3-(p-methoxyphenyl)acrylate or mixtures thereof. A specific example of an ultraviolet light absorber that may be present is UV 234, which is a high molecular weight ultraviolet light absorber of the hydroxyl phenyl benzotriazole class. The UV light absorber, when present, can be present in the polymer composition in an amount ranging from about 0.1% by weight to about 2% by weight, such as in an amount ranging from about 0.25% by weight to about 1% by weight based on the total weight of the polymer composition.

In one embodiment, the polymer composition may also include a formaldehyde scavenger, such as a nitrogen-containing compound. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine(melamine) and its derivatives, such as melamine-formaldehyde condensates and methylol melamine. Oligomeric polyamides are also suitable in principle for use as formaldehyde scavengers. The formaldehyde scavenger may be used individually or in combination.

Further, the formaldehyde scavenger can be a guanidine compound which can include an aliphatic guanamine-based compound, an alicyclic guanamine-based compound, an aromatic guanamine-based compound, a hetero atom-containing guanamine-based compound, or the like. The formaldehyde scavenger can pe present in the polymer composition in an amount ranging from about 0.005% by weight to about 2% by weight, such as in an amount ranging from about 0.0075% by weight to about 1% by weight based on the total weight of the polymer composition.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (IRGANOX® 1010, BASF), triethylene glycol bis[3-(3-tert-butyl-4-hydroxy-5-methylphenyl)propionate] (IRGANOX® 245, BASF), 3,3'-bis[3-(3,5-di-tert-butyl-4-hydroxyphenyl)propionohydrazide] (IRGANOX® MD 1024, BASF), hexamethylene glycol bis[3-(3,5-di-cert-butyl-4-hydroxyphenyl)propionate] (IRGANOX® 259, BASF), and 3,5-di-tert-butyl-4-hydroxytoluene (LOWINOX® BHT, Chemtura). The above compounds may be present in the polymer composition in an amount ranging from about 0.01% by weight to about 1% by weight based on the total weight of the polymer composition.

In one embodiment, the polymer composition of the present disclosure contains significant amounts of antioxidant and other stabilizers. For example, the polymer composition can be formulated so as to contain one or more sterically hindered phenol compounds in an amount greater than about 0.3% by weight, such as in an amount greater than about 0.4% by weight, such as in an amount greater than about 0.45% by weight, and generally in an amount less than about 5% by weight, such as in an amount less than about 2% by weight. Including greater amounts of antioxidant can increase the thermal stability of the polymer composition. For example, when the polymer composition is exposed to a temperature of 160° C. for 12 hours, the polymer composition may experience a weight loss of only less than about 1% by weight, such as less than about 0.8% by weight, such as less than about 0.6% by weight, such as less than about 0.5% by weight.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be present in the polymer composition in an amount ranging from about 0.1% by weight to about 2% by weight, such as in an amount ranging from about 0.25% by weight to about 1% by weight based on the total weight of the polymer composition.

In one embodiment, the composition may also contain one or more lubricants. The lubricant may comprise a polymer wax composition. Lubricants that may be included in the composition include, for instance, N, N'-ethylene bisstearamide or ethylene bis-stearamide (EBS) wax, which is based on monocarboxylic acids derived from naturally occurring vegetable oils. Further, in one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount ranging from about 0.005% by weight to about 2% by weight, such as in an amount ranging from about 0.0075% by weight to about 1% by weight, such as in an amount ranging from about 0.01% by weight to about 0.5% by weight based on the total weight of the polymer composition.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount ranging from about 0.01% by weight to about 1% by weight based on the total weight of the polymer composition.

Any of the above additives can be added to the polymer composition alone or combined with other additives. In general, each additive is present in the polymer composition in an amount less than about 5% by weight, such as in an amount ranging from about 0.005% by weight to about 2% by weight, such as in an amount ranging from about 0.0075% by weight to about 1% by weight, such as from about 0.01% by weight to about 0.5% by weight based on the total weight of the polymer composition.

In one embodiment, the polymer composition is free of any nucleants that may increase the crystallinity of the polyoxymethylene polymer. For instance, the polymer composition may be free or contain no oxymethylene terpolymers, talc particles, or the like.

In forming a feed material for a three-dimensional printing system, a mixture of components as described above can be blended together and extruded into a filament or into pellets. When formed into a filament, a continuous filament can be formed having a diameter of greater than about 0.5 mm, such as greater than about 1 mm, such as greater than about 1.5 mm, and generally less than about 5 mm, such as less than about 4 mm, such as less than about 3.5 mm. In one embodiment, the filament can have a diameter of about 1.75 mm. In an alternative embodiment, the filament can have a diameter of about 3 mm.

When formed into polymeric pellets, the pellets can generally have a diameter of greater than about 0.25 mm, such as greater than about 0.5 mm, such as greater than about 0.75 mm, such as greater than about 1 mm, such as greater than about 1.25 mm, and less than about 2.5 mm, such as less than about 2.25 mm, such as less than about 2 mm, such as less than about 1.75 mm. The pellets can have a length of generally greater than about 1 mm, such as greater than about 4 mm, such as greater than about 6 mm, such as greater than about 8 mm, such as greater than about 10 mm, such as greater than about 12 mm, and less than about 20 mm, such as less than about 18 mm, such as less than about 16 mm, such as less than about 14 mm.

The polymer composition of the present disclosure is uniquely formulated for use in three-dimensional extrusion printing systems. Thus, the polymer composition is particularly well suited as a feed material that may be employed to form three-dimensional articles in a layer by layer fashion.

For instance, the polymer composition can be formulated so as to display dramatically improved dimensional stability in relation to the polyoxymethylene polymer by itself. Dimensional stability can be measured by determining mold shrinkage of a molded specimen in accordance with ISO Test 294-4, 2577. One or more dimensional stabilizing agents can be blended with the polyoxymethylene polymer such that shrinkage can be reduced by at least about 10%, such as at least about 15%, such as at least about 20%, such as at least about 25%, such as at least about 30%, such as at least about 35%, such as at least about 40%, such as at least about 45%, such as at least about 50% in relation to the shrinkage characteristics of the polyoxymethylene polymer tested by itself.

In general, the polymer composition can have a shrinkage of 3% or less, such as 2% or less, such as 1.5% or less, such as 1.3% or less, such as 1.1% or less, such as 0.9% or less.

The polymer composition, in one embodiment, whether in the form of a filament or polymeric pellets, can be incorporated into a printer cartridge that is readily adapted for incorporation into a three-dimensional printer system. For example, referring to FIG. 2, one embodiment of a printer cartridge 10 is illustrated. The printer cartridge 10 includes a spool 12. When the polymer composition of the present disclosure is in the form of a filament, the filament can be wound around the spool 12. The spool 12 can define a central bore which fits around an axle 14 within the printer cartridge 10.

Figure 2:
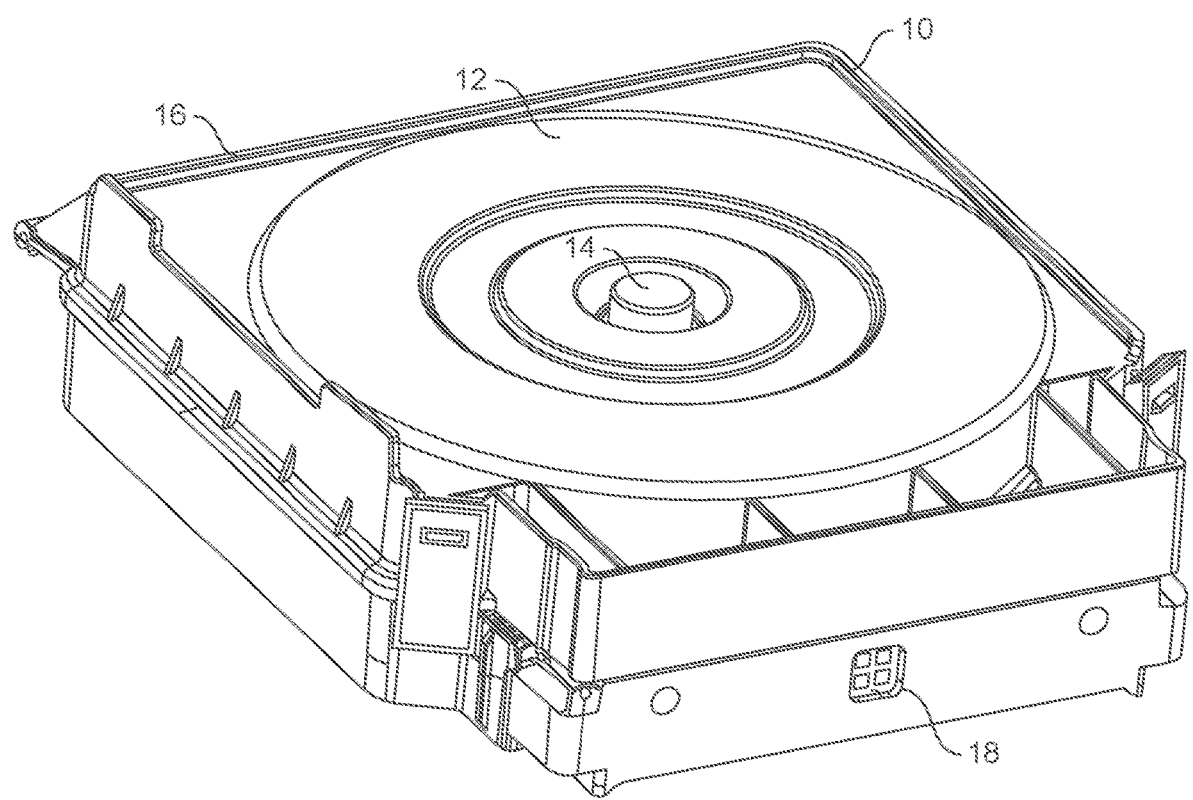
FIG. 2 is a perspective view of one embodiment of a printer cartridge that may be used in accordance with the present disclosure.

As shown in FIG. 2, although not necessary, the spool 12 can be enclosed within a housing 16 that protects the filament from the exterior environment prior to use.

The printer cartridge 10 can have a shape and configuration well suited for use in a particular type of printing system. In one embodiment, for instance, the printer cartridge 10 can include an identifying device 18 that allows a printer system to identify the printer cartridge. The identifying device 18, for instance, may comprise a machine readable component, such as a machine readable chip.

When the feed material of the present disclosure is in the form of polymeric pellets, on the other hand, the printer cartridge 10 can include a dispensing container contained within the housing 16. The dispensing container can be for feeding the polymeric pellets into the three-dimensional printer system.

Generally speaking, any of a variety of three-dimensional printer systems can be employed in the present disclosure to produce three-dimensional articles. Referring to FIG. 1, for example, one embodiment of an extrusion-based, three-dimensional printer system 30 is shown that may be configured to receive the printer cartridge 10 as shown in FIG. 2. The printer system 30 includes a pair of feed rollers 32 that engage a feed material 34. The feed material 34 is made from the polymer composition of the present disclosure. In this embodiment, the feed material 34 is in the form of a filament. The feed rollers 32 can rotate clockwise and/or counterclockwise at a desired rate in order to feed and retract the filament 34 in very precise amounts into the downstream process. From the feed rollers 32, the filament 34 is fed to a heating device 36 positioned upstream from a nozzle 38. The heating device 36 melts the filament to a useable temperature. The nozzle 38 extrudes the filament 34 onto a platform 40. In general, the feed material 34 exits the nozzle 38 at a diameter smaller than the filament that is fed to the nozzle. The nozzle 38 and/or the platform 40 are then moved in a pattern in order to form a three-dimensional article in a layer by layer manner. In one embodiment, the nozzle 38 and/or the platform 40 are moved not only in the X and Y plane but also in the Z plane.

The printing system 30 can also include a controller 42 which may comprise one or more programmable devices or microprocessors. The controller 42 can store a particular pattern and then control the printing system 30 in order to deposit the feed material onto the platform 40 in a desired manner for forming a three-dimensional article 50.

As shown in FIG. 1, during the printing process, the feed material 34 is heated to a molten state. The filament deposits onto the platform 40 in a layer by layer manner and thermally bonds with each successive layer. Thus, in order to manipulate the molten polymer material as it is being deposited onto the platform 40 and in order to ensure that the adjacent layers bond together, the polymer composition optimally has an enlarged operating window. In this regard, the one or more dimensional stabilizing agents of the present disclosure can not only provide dimensional stability but can also improve the operating window of the polyoxymethylene polymer. For instance, in one embodiment, the polymer composition of the present disclosure has a crystallinity temperature and has a melting temperature and wherein the difference between the melting temperature and the crystallinity temperature is at least 10° C., such as at least 12° C., such as at least 14° C., such as at least 16° C., such as at least 18° C., such as at least 20° C., such as at least 22° C., such as at least 24° C., such as at least 30° C., and generally less than about 50° C., such as less than about 40° C., such as less than about 35° C. For example, the polymer composition can have a melting temperature of less than about 185° C., such as less than about 180° C., such as less than about 175° C., such as less than about 170° C. and generally greater than 150° C. The polymer composition can also have a crystallinity temperature of greater than about 135° C., such as greater than about 140° C., such as greater than about 145° C., and generally less than about 150° C. As used herein, the melting temperature and the crystallinity temperature are the extrapolated onset temperatures for melting and crystallization determined according to ISO Test 11357 or 11357-1 (2016).

The present disclosure may be better understood with reference to the following examples.

Example No. 1

Various polymer formulations were formulated and tested for various properties. In this example, the comonomer content of the polyoxymethylene polymer was varied.

More particularly, the following table includes the polymer compositions that were formulated and the physical properties that were obtained.

|  | Sample No. 1 | Sample No. 2 | Sample No. 3 | Sample No. 4 | Sample No. 5 |
| --- | --- | --- | --- | --- | --- |
| Polyoxymethylene Polymer (comonomer content 3.4 wt %, melt flow rate 46 cm³/10 min) | 99.18 | | | | |
| Polyoxymethylene Polymer (comonomer content 0.7 wt %, melt flow rate 2.1 cm³/10 min) | | | | | 99.35 |
| Polyoxymethylene Polymer (comonomer content 1.5 wt %, melt flow rate 13.7 cm³/10 min) | | 98.95 | 99.35 | 79.35 | |
| Phenolic antioxidant | 0.5 | 0.25 | 0.5 | 0.5 | 0.5 |
| Ethylene copolymer, calcium acetate, Surlyn compatibilizer, Elvamide polyamide | 0.15 | | 0.15 | 0.15 | 0.15 |
| Calcium 12 hydroxy stearate | 0.07 | | | | |
| Allantoin | 0.1 | | | | |
| Polyoxymethylene polymer | | | | 20 | |
| Polyoxymethylene terpolymer | | 0.5 | | | |
| Ethylene bisstearamide | | 0.2 | | | |
| Tricalcium citrate | | 0.05 | | | |
| Copolyamide | | 0.05 | | | |
| Total (%) | | 100 | 100 | 100 | 100 |

-continued

|  | Sample No. 1 | Sample No. 2 | Sample No. 3 | Sample No. 4 | Sample No. 5 |
|---|---|---|---|---|---|
| MI (ISO 1133) | 46 | 13.71 | 13.98 | 16.3 | 2.11 |
| KD |  | 0 | 0.008 | 0.007 | 0.006 |
| Vol |  | 0.063 | 0.098 | 0.063 | 0.01 |
| Flex modulus(Mpa) ISO 178 | 2509 | 2691 | 2539 | 2214 | 2468 |
| Flex strength(Mpa) ISO 527-2/1A | 66.6 | 71.97 | 66.53 | 58.39 | 64.6 |
| Tensile Modulus (MPa) ISO 527-2/1A | 2721 | 2988.00 | 2754.00 | 2390.00 | 2631.00 |
| Yield Stress (MPa) ISO 527-2/1A | 62.91 | 67.58 | 65.29 | 59.31 | 64.68 |
| Yield Strain (%) ISO 527-2/1A | 7.98 | 10.91 | 12.95 | 12.29 | 21.53 |
| Break Stress (MPa) ISO 527-2/1A |  | 63.2 | 64.1 | 51.45 | 62.2 |
| Break Strain (%) ISO 527-2/1A2 | 17.72 | 31.23 | 22.97 | 51.4 | 46.69 |
| Charpy notched (KJ/m$^2$) ISO 179/1eA | 3.1 | 7.7 | 7.1 | 10 | 13.6 |
| Unnotched Charpy (KJ/m$^2$) | 90.4 | 226.5 | 257.1 | 271 | 239.8 |
| Process Window (Tm-Tc) | 23.0 | 24.0 | 23.5 | 23.8 | 27.8 |

Example No. 2

In the following example, a polyoxymethylene copolymer was combined with various different dimensional stabilizing agents in order to demonstrate the improvements in shrinkage control. The polymer compositions were compared to a composition that only contained a polyoxymethylene polymer (Sample No. 6). The following polymer compositions were tested:

Sample No. 6: Polyoxymethylene copolymer having an MFR of 9 g/10 min;

Sample No. 7: Polyoxymethylene copolymer combined with 9% by weight of a thermoplastic polyurethane elastomer;

Sample No. 8: Polyoxymethylene copolymer combined with 18% by weight of a thermoplastic polyurethane elastomer;

Sample No. 9: Polyoxymethylene copolymer combined with 15% by weight glass fibers and 7% by weight high density polyethylene particles (4.5 million g/mol); and Sample No. 10: Polyoxymethylene copolymer combined with 15% by weight N-butylbenzene sulfonamide.

The above polymer compositions were tested for various physical properties and the following results were obtained:

As shown above, the inclusion of a dimensional stabilizing agent dramatically improved the shrinkage properties of the polymer composition.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A feed material for a three-dimensional extrusion printing system, the feed material comprising:
   a continuous filament or a polymeric pellet, the filament having a filament diameter of from about 0.5 mm to about 5 mm, the polymeric pellet having a diameter of from about 0.5 mm to about 2 mm and having a length of from about 1 mm to about 20 mm; and
   wherein the continuous filament or polymeric pellet is comprised of a polymer composition, the polymer composition comprising a polyoxymethylene polymer

| Sample No. | 6 | 7 | 8 | 9 | 10 |  |  |
|---|---|---|---|---|---|---|---|
| Physical properties | Value | Value | Value | Value | Value | Unit | Test Standard |
| ISO |  |  |  |  |  |  |  |
| Density | 1410 | 1380 | 1360 | 1460 | 1350 | kg/m$^3$ | ISO 1183 |
| Melt volume rate, MVR | 8 | 5.5 | 4 | 1.1 | 2 | cm$^3$/10 min | ISO 1133 |
| MVR temperature | 190 | 190 | 190 | 190 | 190 | ° C. | ISO 1133 |
| MVR load | 2.16 | 2.16 | 2.16 | 2.16 | 2.16 | kg | ISO 1133 |
| Molding shrinkage, parallel | 2.0 | 1.8 | 1.6 | 1.1 | 1.5 | % | ISO 294-4, 2577 |
| Molding shrinkage, normal | 1.9 | 1.6 | 1.5 | 0.9 | 1.6 | % | ISO 294-4, 2577 |
| Water Absorption, 23° C.-sat | 0.75 | 0.8 | 0.8 | — | 0.3 | % | ISO 62 |
| Humidity absorption, 23° C./50% RH | 0.2 | 0.25 | 0.25 | — | — | % | ISO 62 | in an amount greater than about 30% by weight, the polyoxymethylene polymer comprising a polyoxymethylene copolymer having a comonomer content of greater than about 0.3% by weight and less than about 1% by weight, the polyoxymethylene polymer being blended with a dimensional stabilizing agent, wherein the difference between the melting temperature and the crystallinity temperature of the polymer composition is from about 27° C. to about 50° C., the polymer composition displaying a shrinkage of 1.8% or less when tested according to ISO Test 294-4, 2577.

2. A feed material as defined in claim 1, wherein the dimensional stabilizing agent comprises an amorphous polymer or an elastomeric polymer.

3. A feed material as defined in claim 1, wherein the dimensional stabilizing agent comprises a methacrylate butadiene styrene, a styrene acrylonitrile, a polycarbonate, a polyphenylene oxide, an acrylonitrile butadiene styrene, a methyl methacrylate, a polylactic acid, a copolyester elastomer, a styrene ethylene butylene styrene block copolymer, a thermoplastic vulcanizate, an ethylene copolymer or terpolymer, an ethylene propylene copolymer or terpolymer, a polyalkylene glycol, a silicone elastomer, an ethylene acrylate, a sulfonamide, high density polyethylene particles or mixtures thereof.

4. A feed material as defined in claim 1, wherein the dimensional stabilizing agent comprises a thermoplastic polyurethane elastomer, the thermoplastic polyurethane elastomer being present in the polymer composition in an amount from about 4% to about 40% by weight.

5. A feed material as defined in claim 4, wherein the polymer composition further comprises a coupling agent.

6. A feed material as defined in claim 1, wherein the polyoxymethylene polymer is present in the polymer composition in an amount greater than about 60% by weight and in an amount less than about 95% by weight.

7. A feed material as defined in claim 1, wherein the polymer composition has a melting temperature and has a crystallinity temperature, and wherein the melting temperature is less than about 180° C. and the crystallinity temperature is greater than about 130° C.

8. A feed material as defined in claim 1, wherein the polyoxymethylene polymer contains terminal hydroxyl groups in an amount greater than about 15 mmol/kg and in an amount less than about 100 mmol/kg.

9. A feed material as defined in claim 1, wherein the polymer composition is free of filler fibers.

10. A feed material as defined in claim 1, wherein the polymer composition has a melt flow index of less than about 50 g/10 min.

11. A printer cartridge for a three-dimensional extrusion printing system, the printer cartridge containing the feed material as defined in claim 1.

12. A printer cartridge as defined in claim 11, wherein the feed material comprises the filament, and wherein the filament is wound around a spool in the printer cartridge.

13. A printer cartridge as defined in claim 11, wherein the feed material comprises the polymeric pellets, and wherein the polymeric pellets are contained in a dispensing container within the printer cartridge.

14. A three-dimensional printing system comprising a three-dimensional printing device and the printer cartridge as defined in claim 11.

15. A three-dimensional article formed layer by layer from the feed material of claim 1.

16. A method for producing a three-dimensional article comprising selectively forming a three-dimensional structure from a polymer feed material, the polymer feed material comprising the feed material as defined in claim 1.

* * * * *